«12» United States Patent
Richter et al.

(10) Patent No.: US 7,097,167 B2
(45) Date of Patent: Aug. 29, 2006

(54) HYDRAULIC RADIAL BEARING

(75) Inventors: Matthias Richter, Bissingen (DE);
Falk Berge, Lauenau (DE); Meinert Holst, Barsinghausen (DE); Jürgen Roos, Trelzer 3 (DE)

(73) Assignee: ContiTech Vibration Control GmbH, Hannover (DE)

( * ) Notice: Subject to any disclaimer, the term of this patent is extended or adjusted under 35 U.S.C. 154(b) by 0 days.

(21) Appl. No.: 10/736,500

(22) Filed: Dec. 17, 2003

(65) Prior Publication Data

US 2004/0159992 A1  Aug. 19, 2004

(30) Foreign Application Priority Data

Dec. 18, 2002 (DE) ................................ 102 59 624

(51) Int. Cl.
*F16F 5/00* (2006.01)
*F16F 13/14* (2006.01)
(52) U.S. Cl. ............... 267/140.12; 267/219; 267/141.2
(58) Field of Classification Search ........... 267/140.12, 267/219, 220, 141.2
See application file for complete search history.

(56) References Cited

U.S. PATENT DOCUMENTS 5,007,304 A * 4/1991 Ide .................. 267/140.12
5,076,550 A * 12/1991 Mayama et al. ....... 267/140.12
5,184,803 A * 2/1993 Tanabe et al. ......... 267/140.12
5,333,847 A * 8/1994 Kanda ................... 267/140.12
5,370,376 A * 12/1994 Ishiyama ............... 267/140.12
5,427,361 A * 6/1995 Suzuki et al. .......... 267/140.12
5,725,202 A * 3/1998 Nakamura et al. ..... 267/140.12
6,598,863 B1 * 7/2003 Kato ..................... 267/140.12

FOREIGN PATENT DOCUMENTS

GB  2192968  1/1988

* cited by examiner

*Primary Examiner*—Thomas J. Williams
(74) *Attorney, Agent, or Firm*—Walter Ottesen

(57) ABSTRACT

A work chamber is filled with a hydraulic liquid and is disposed between the legs of the spring body of a hydraulic radial bearing. The work chamber is connected to a compensating chamber via a transfer channel. The desired absorption of disturbing noises in the region of 130 Hz is obtained with a special dimensioning of the cross-sectional area of the work chamber, the dynamic swell stiffness of the spring body and the length (L) and the total cross-sectional area ($A_2$) of the transfer channel. The ratio of the effective cross-sectional area ($A_1$) of the work chamber to the cross-sectional area ($A_2$) of the channel lies preferably between 0.1 and 10 while the ratio of the length (L) of the transfer channel to the total cross-sectional area ($A_2$) of the transfer channel is in the range of 0.1 to 4.0.

9 Claims, 6 Drawing Sheets

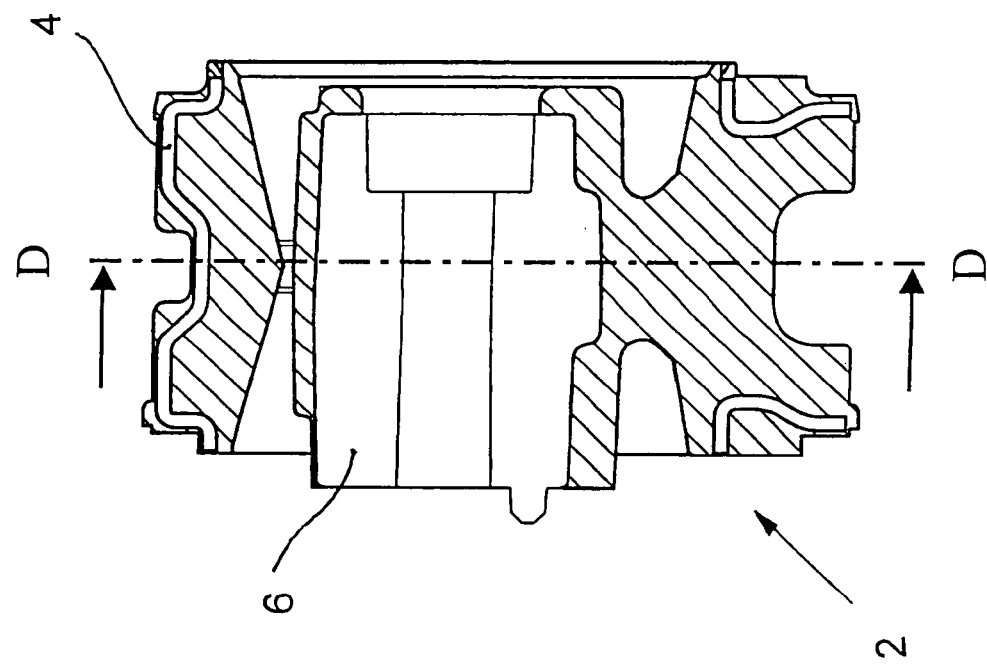
Fig. 3  A-A
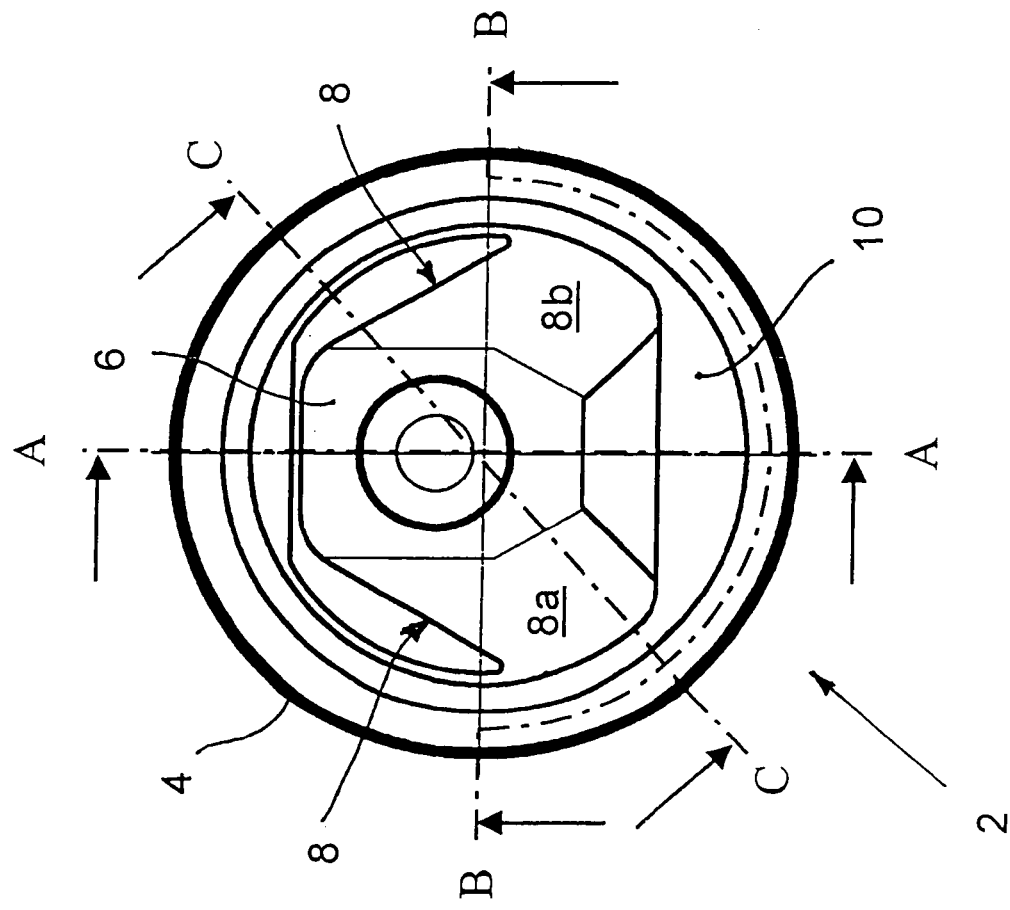
Fig. 2

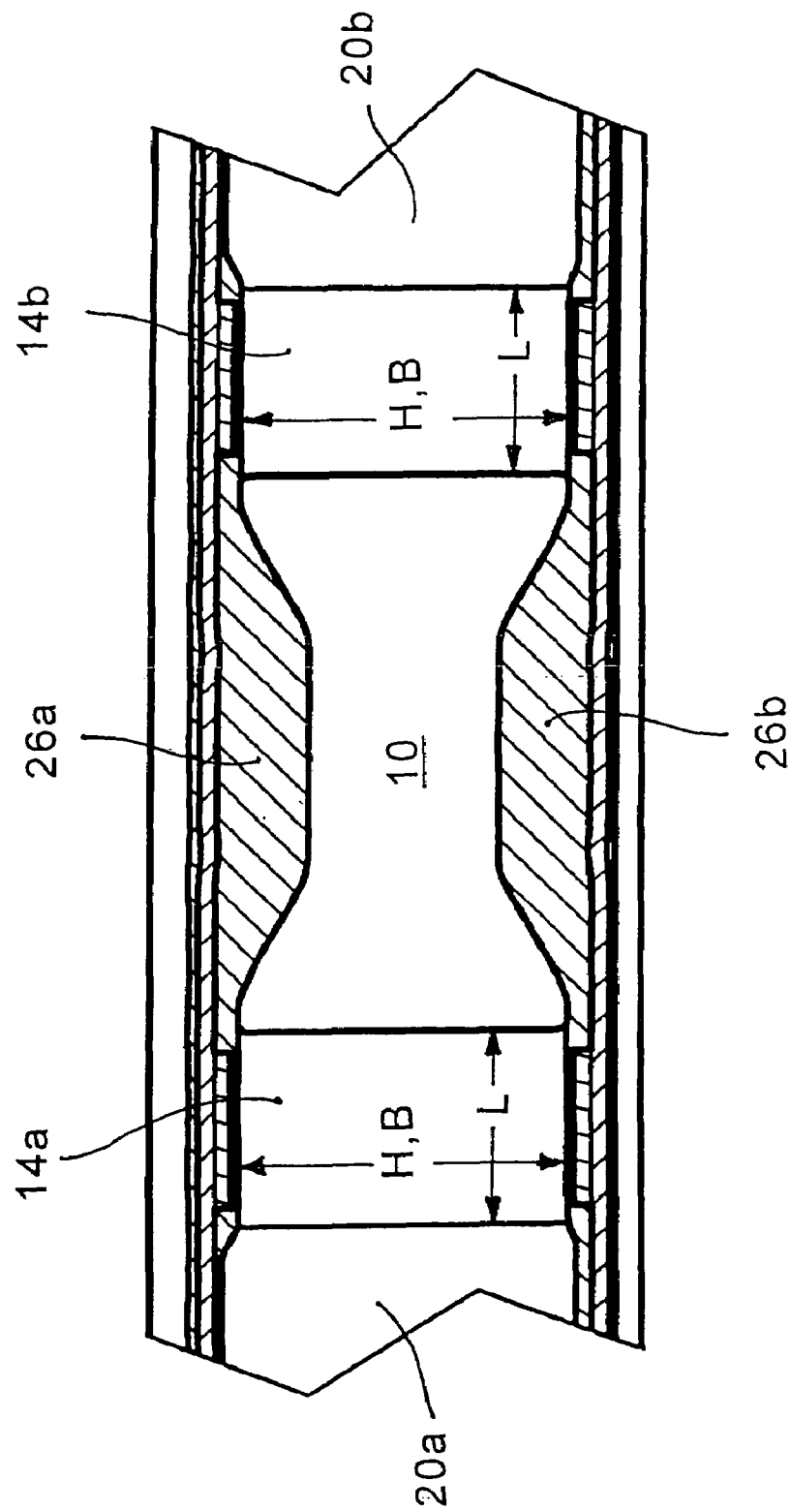

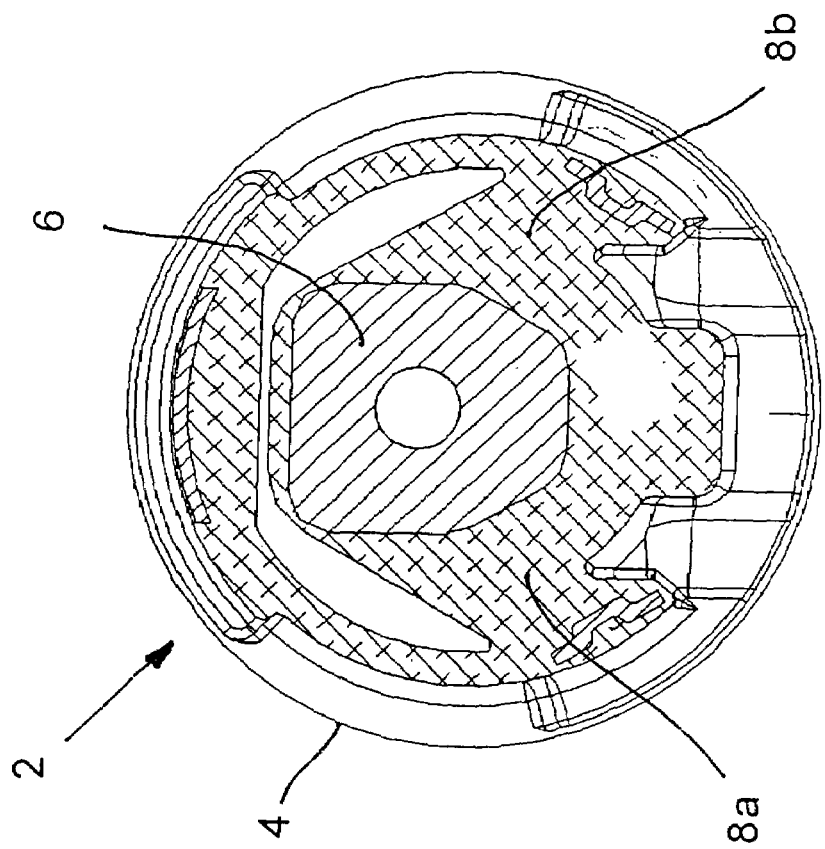
Fig. 6 D-D
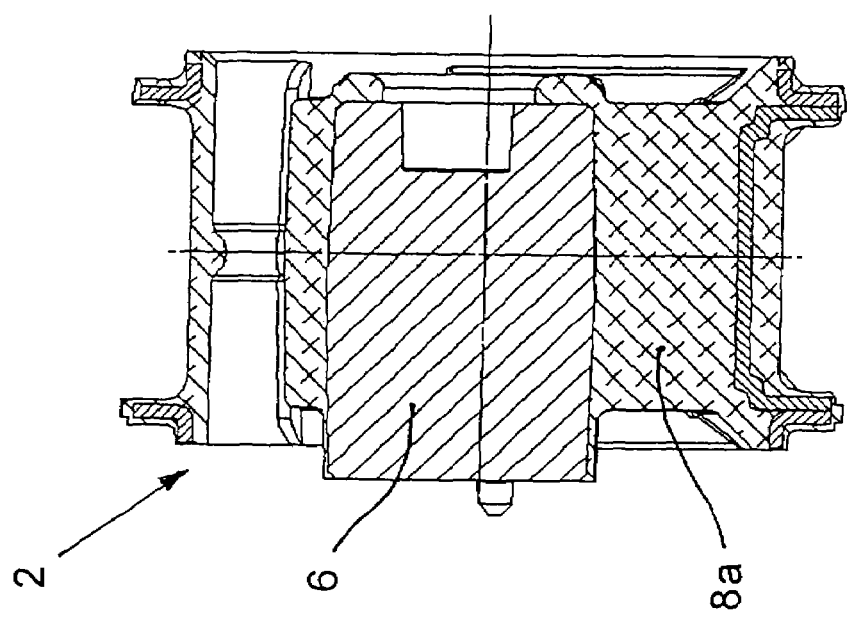
Fig. 5 C-C

HYDRAULIC RADIAL BEARING

FIELD OF THE INVENTION

The invention relates to a hydraulic radial bearing, a so-called hydro bushing as they are used for mounting engines in motor vehicles.

BACKGROUND OF THE INVENTION

In addition to the insulation of vibrations, which is also provided by conventional rubber elements, the hydro bushings include a damping characteristic for damping the vibrations occurring in the vehicle between the engine and the chassis. As described with respect to FIG. 7, the damping characteristics are achieved with a system integrated into the hydro bushing. This system comprises a support spring, which acts as a piston, and a channel. Here, the mass in the channel and the volume stiffness form a vibration-capable system.

Such systems are matched to approximately 10 Hz and are therefore able to compensate for the inherent vibrations of the engine. Conventional standard hydro bushings are completely unsuited for damping in the lower hearing range.

The invention is directed to a hydro bushing which can filter out acoustic disturbing noises, especially in the region of approximately 130 Hz.

United Kingdom patent application 2,192,968 (corresponding to U.S. patent application Ser. No. 888,595, filed Jul. 23, 1986) is directed to comparatively large vibration amplitudes in the region of the inherent frequency of the damping system as well as to high frequency vibrations of comparatively small amplitude. For attenuating low frequencies of large amplitude, there are two volume-changeable chambers which are connected to each other via a transfer channel as in a standard hydro bushing. Additionally, a further gas chamber for taking up high frequency vibrations of low amplitude is provided and this gas chamber is closed off with an elastic membrane, that is, here, in the acoustic range, only small amplitudes can be filtered out. A further disadvantage is that additional measures are required for damping the expanded range. The manufacture with respect to these measures is associated with additional complexity.

SUMMARY OF THE INVENTION

It is an object of the invention to provide a simply configured radial bearing of the kind referred to initially herein which can absorb disturbing noises, especially in the region of approximately 130 Hz, with a low dynamic stiffness.

The hydro bushing of the invention is for radially supporting a motor. The hydro bushing includes: a sleeve-shaped outer body; an inner support body spaced radially from the outer body; a spring body having two legs and being disposed between the outer body and the support body; a volume-changeable work chamber disposed between the legs of the spring body; the volume-changeable work chamber being delimited to the outside by the sleeve-shaped outer body; at least one compensating chamber disposed laterally of the work chamber and having an elastic wall; a transfer channel interconnecting the work chamber and the compensating chamber; the chambers and the channel being filled with a low-viscous hydraulic fluid; the work chamber having an effective cross-sectional area ($A_1$) and the spring body having a dynamic swell stiffness; the transfer channel having a length (L) and a cross-sectional area ($A_2$); and, the cross-sectional area ($A_1$), the dynamic swell stiffness, the length (L) and the cross-sectional area ($A_2$) all being so selected that the hydro bushing has a natural or resonant frequency of approximately 130 Hz.

The advantages of the invention will be explained hereinafter with respect to a comparison to the relevant state of the art.

BRIEF DESCRIPTION OF THE DRAWINGS

The invention will be described in the following with respect to an embodiment of the radial bearing of the invention and a conventional standard hydro bushing wherein:

FIG. 2 is a front view of the radial bearing of FIG. 1;

FIG. 3 is a section view taken along line A—A of FIG. 2;

FIG. 4 is a section view taken along line B—B of FIG. 2;

FIG. 5 is a section view taken along line C—C of FIG. 2;

FIG. 6 is a section view taken along line D—D of FIG. 3;

DESCRIPTION OF THE PREFERRED EMBODIMENTS OF THE INVENTION

Figure 1:
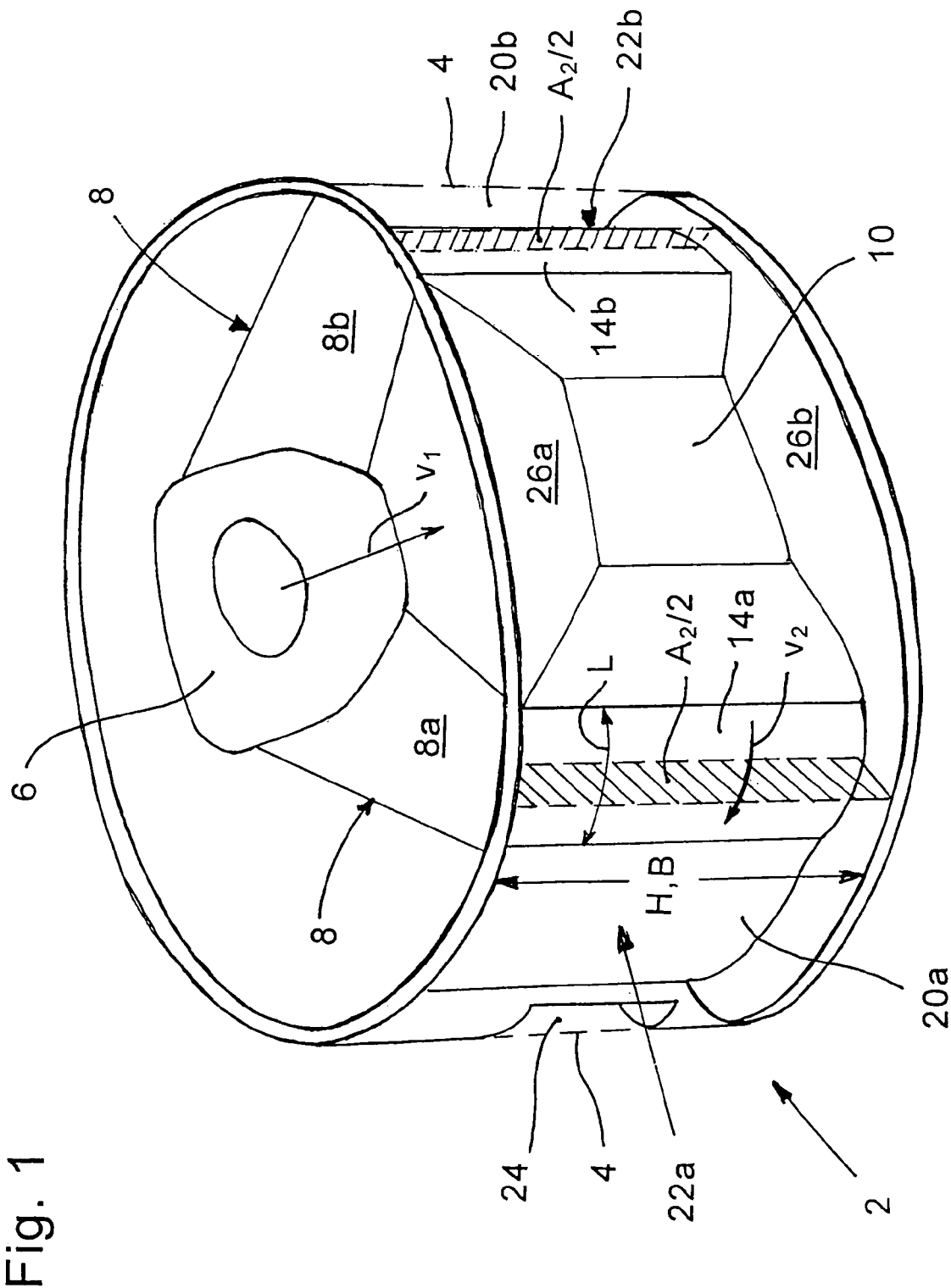
FIG. 1 is a hydro bushing (radial bearing) according to the invention in a perspective view with this view being from the side and viewed from below at an angle (the outer body is removed)
Figure 7:
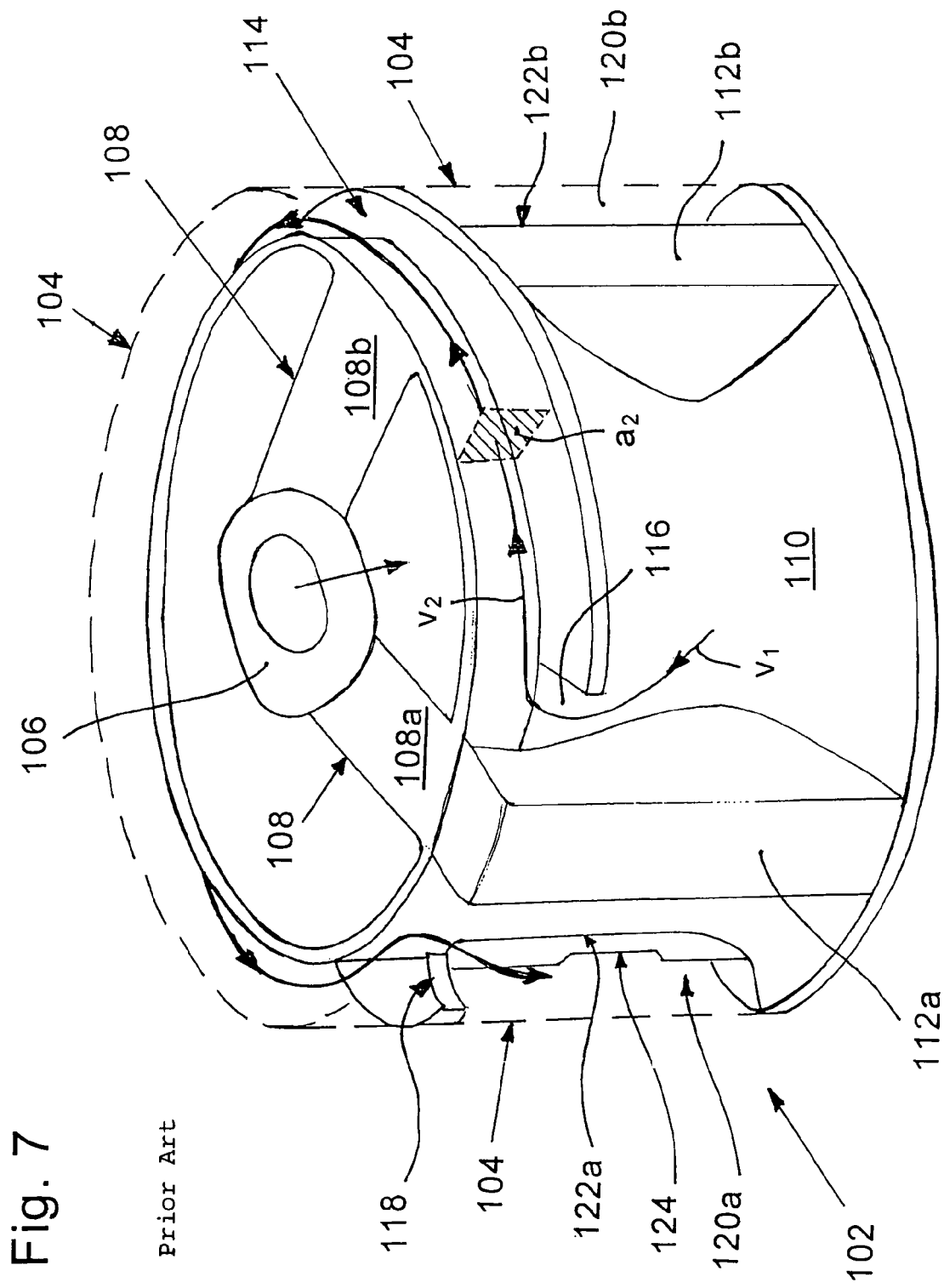
FIG. 7 shows a standard hydro bushing according to the state of the art viewed from the side at an angle from below (outer body removed); and, FIGS. 8a and 8b are schematics for explaining the continuity equation and the Bernoulli equation.

The standard hydro bushing 102 shown in FIG. 7 essentially comprises: a sleeve-shaped outer body 104 (shown in phantom outline); an inner mounting body 106 (for accommodating a bearing lug) which is spaced radially to the outer body 104; and, a two-legged spring body 108 disposed between the outer body 104 and the inner body 106.

A volume-changeable work chamber 110 is filled with hydraulic liquid and is disposed between the legs (108a, 108b) of the spring body 108. The work chamber 110 is delimited from the outside by the outer body 104 and on both sides by respective massive legs (112a, 112b). A transfer channel 114 is arranged annularly at the inner side of the outer body 104 and extends peripherally. One end of the transfer channel 114 has an opening 116 to the work chamber 110 and the other end has an opening 118 to a compensating chamber 120a arranged to one side in the bearing 102. The compensating chamber 120a is likewise delimited toward the outside by the cylindrical body 104 which encloses all. The compensating chamber 120a includes a flexible membrane 122a toward the inside.

For reasons of symmetry, a further compensating chamber 120b and a flexible membrane 122b (not shown) are disposed on the side lying opposite the compensating chamber 120a and are configured overall to be the mirror image thereof. Both compensating chambers (120a, 120b) are connected to each other via a connecting channel 124.

Figure 8A:
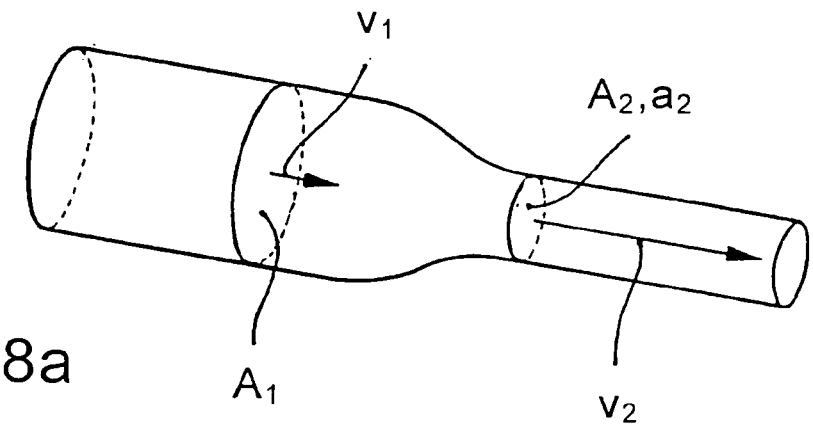
Figure 8B:
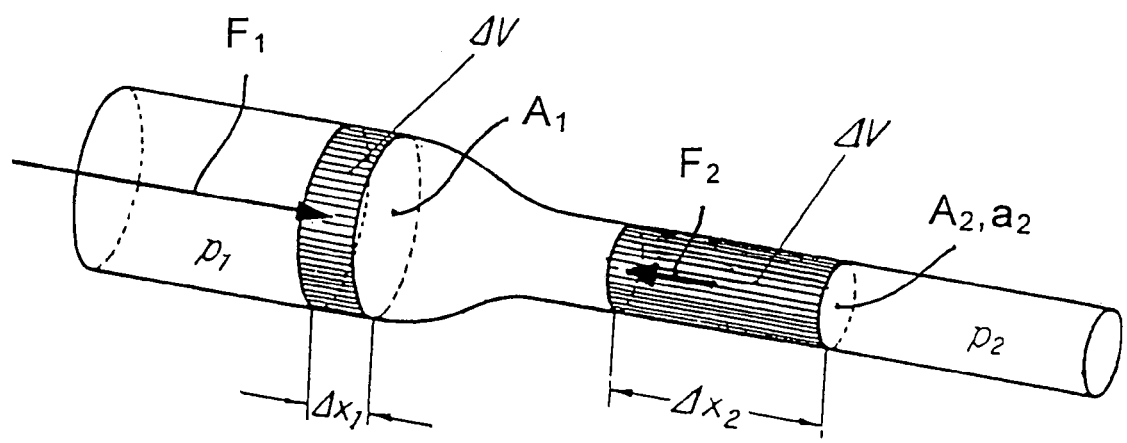

If a dynamic load $F_1$ acts on the hydro bearing 102, then the two-legged spring body 108 deforms whereby the spring body 108 presses like a piston on the hydraulic liquid disposed in the work chamber 110. The effective piston area $A_1$ is given by the liquid volume $\Delta V$, which is displaced from or into the "piston", and its speed $v_1$. The liquid quantity displaced by the spring body 108 is compelled to escape through the transfer channel 114 (cross section $a_2$, flow speed $v_2$) into the compensating chambers (120a, 120b). The flow takes place in accordance with the continuity equation:

$$A_1 \cdot v_1 \cdot \rho = a_2 \cdot v_2 \cdot \rho$$

or $A_1 \cdot v_1 \cdot \rho = A_2 \cdot v_2 \cdot \rho$ (see FIG. 8a)

and the Bernoulli equation $$p_1 + \rho/2 \cdot v_1^2 = p_2 + \rho/2 \cdot v_2^2 \quad \text{(see FIG. 8b).}$$

A jump in velocity of the speed $v_1$ to the speed $v_2$ takes place at the crossover location from the wide work chamber 110 to the narrow crossover channel 114. This jump in velocity releases considerable reaction forces $F_2$ (FIG. 8b) which effect a swelling of the spring body 108. The spring body 108 is therefore characterized by a so-called dynamic swell stiffness in addition to static spring stiffness. The dynamic swell stiffness in combination with the effective mass of the hydraulic liquid vibrating in the transfer channel 114 essentially determines the inherent frequency of the hydro bearing 102 which is effective to reduce vibration. This inherent frequency lies at approximately 10 Hz in a conventional standard hydro bearing 102.

With a conventional hydro bearing 102, it is not possible to realize the frequency region of approximately 130 Hz with purely constructive measures (dimensioning measures).

The significant similarities and the differences with respect to the hydro bearing 2 of the invention will now be explained based on a comparison.

The radial bearing 2 of the invention is shown in FIGS. 1 to 6 and essentially likewise includes: a sleeve-shaped outer body 4 (shown in phantom outline in FIG. 1); an inner mounting body 6 which is disposed radially spaced to the outer body 4; and, a two-legged spring body 8 disposed between the outer body 4 and the inner body 6. A work chamber 10 is likewise filled with hydraulic liquid and is changeable in volume. The work chamber 10 is likewise disposed between the legs (8a, 8b) of the spring body and is delimited toward the outside by the outer body 4.

The bearing 2 of the invention also includes compensating chambers (20a, 20b) which are likewise connected to each other by a connecting channel 24. Each of the compensating chambers (20a, 20b) is provided with an elastic wall (flexible membrane 22a or 22b).

According to the invention, the work chamber 10 is connected to the two compensating chambers (20a, 20b) via respective transfer channels (14a, 14b). These transfer channels (14a, 14b) comprise a partial non-presence of the side walls (see legs 112a and 112b; FIG. 7) of the work chamber 10. The width B of the channels (14a, 14b) is identical to the total height H of the cylindrical bearing 2. The length L of the two channels (14a, 14b) is considerably less than their width B. The channels (14a, 14b) extend directly into the corresponding compensating chambers (20a, 20b) which is favorable with respect to flow. The two transfer channels (14a, 14b) are connected parallel to each other. In this way, their respective cross sections add to a total cross section $A_2$. The two compensating chambers (20a, 20b) are connected directly via respective transfer channels (14a, 14b) to the volume-changeable work chamber 10. For this reason, the connecting channel 24 functions only to compensate for an asymmetric loading of the bearing 2. The connecting channel 24 bridges the two compensating chambers (20a, 20b).

With the construction in accordance with the invention, a dimensioning of transfer channels is achieved for the first time, which makes it possible to place the frequency, which is relevant for the absorption, in the region of approximately 130 Hz. The relevant frequency is here also computed from the effective mass of the hydraulic liquid, which is vibration capable in the transfer channels, in combination with the dynamic swell stiffness of the spring body (the dynamic swell stiffness is given by the piston cross section $A_1$ and the flow speed $v_1$ present in the work chamber).

To further reduce the faulty adaptation between the piston cross section $A_1$ and the sum of the transfer channel cross-sectional area $A_2$, the work chamber 10 includes constrictions (26a, 26b).

In order to hold the dynamic stiffness as low as possible, the hydraulic liquid should have a viscosity as low as possible. The viscosity of the liquid and the geometry of the transfer channels ($10 \leftrightarrows 14 \leftrightarrows 20$) should be so selected that the flow of the liquid, which moves from one chamber into the other, is as laminar as possible. This is the case when the Reynold's number is:

$$R_e = \rho \cdot r \cdot v / \eta < 1200$$

wherein: $\rho$=density of the liquid; $\eta$=viscosity; r=characteristic length; v=speed of the liquid.

When realizing the bearing, a viscosity in the range of $\eta = 0.01$ g·cm$^{-1}$·s$^{-1}$ (water, 20° C.) to $\eta = 14.9$ g·cm$^{-1}$·s$^{-1}$ (glycerine, 20° C.) has been shown to be especially suitable.

Because of practical considerations, a frost protection agent should be added to the water when used as a hydraulic liquid, for example, glycol or glycerine, that is, dihydric alcohol or trihydric alcohol.

Furthermore, it should be noted that there is always an adequate distance to the boiling point of the hydraulic liquid in order to reliably preclude cavitation.

It is understood that the foregoing description is that of the preferred embodiments of the invention and that various changes and modifications may be made thereto without departing from the spirit and scope of the invention as defined in the appended claims.

What is claimed is:

1. A hydro bushing for radially supporting a motor, the hydro bushing comprising:

a sleeve-shaped outer body;

an inner support body spaced radially from said outer body;

a spring body having two legs and being disposed between said outer body and said support body;

a volume-changeable work chamber disposed between said legs of said spring body and filled with a low-viscous hydraulic fluid;

said volume-changeable work chamber having a clear distance between said inner support body and said sleeve-shaped outer body;

at least one compensating chamber disposed laterally of and directly next to said work chamber;

said compensation chamber and said work chamber having a common lateral surface therebetween;

transfer channel interconnecting said work chamber and said compensating chamber and being delimited by said common lateral surface;

said work chamber having an effective cross-sectional area ($A_1$) and said spring body having a dynamic swell stiffness;

said transfer channel having a length (L) and a cross-sectional area ($A_2$);

said cross-sectional area ($A_1$), said dynamic swell stiffness, said length (L) and said cross-sectional area ($A_2$) all being so selected that said hydro bushing has a natural or resonant frequency of approximately 130 Hz;

said transfer channel being a first transfer channel;
said compensating chamber being a first compensating chamber on one side of said work chamber,
a second compensating chamber on the other side of said work chamber;
a connecting channel connecting said compensating channels to each other; and,
a second transfer channel interconnecting said work chamber and said second compensating chamber.

2. The hydro bushing of claim 1, wherein the ratio of the effective cross-sectional area ($A_1$) of said work chamber to the cross-sectional area ($A_2$) of said transfer channel lies in a range of 0.1 to 10.

3. The hydro bushing of claim 1, wherein the ratio ($A_1:A_2$) of said cross-sectional areas ($A_1$ and $A_2$) is approximately 2.2.

4. The hydro bushing of claim 1, wherein the ratio of said length (L) of said transfer channel to said cross-sectional area ($A_2$) of said transfer channel lies in a range of 0.1 to 4.0.

5. The hydro bushing of claim 1, wherein the ratio of said length (L) of said transfer channel to said cross-sectional area ($A_2$) of said transfer channel is approximately 1.5.

6. The hydro bushing of claim 1, wherein said cross-sectional area ($A_1$) of said work chamber includes a constriction.

7. The hydro bushing of claim 1, wherein the volume of said work chamber and the volume of said transfer channel define a ratio of 0.1 to 4.0.

8. The hydro bushing of claim 1, wherein the volume ratio of said work chamber and said transfer channel is between 1.0 and 3.0.

9. A hydro bushing for radially supporting a motor, the hydro bushing comprising:
a sleeve-shared outer body;
an inner support body spaced radially from said outer body;
a spring body having two lees and being disposed between said outer body and said support body;
a volume-changeable work chamber disposed between said legs of said spring body and filled with a low-viscous hydraulic fluid;
said volume-changeable work chamber having a clear distance between said inner support body and said sleeve-shaped outer body;
at least one compensating chamber disposed laterally of and directly next to said work chamber;
said compensation chamber and said work chamber having a common lateral surface therebetween;
a transfer channel interconnecting said work chamber and said compensating chamber and being delimited by said common lateral surface;
said work chamber having an effective cross-sectional area ($A_1$) and said spring body having a dynamic swell stiffness;
said transfer channel having a length (L) and a cross-sectional area ($A_2$);
said cross-sectional area ($A_1$), said dynamic swell stiffness, said length (L) and said cross-sectional area ($A_2$) all being so selected that said hydro bushing has a natural or resonant frequency of approximately 130 Hz; and,
one of said legs separating said work chamber from said compensation chamber and ending in spaced relationship to said sleeve-shaped outer body so as to define said common lateral surface.

\* \* \* \* \*

UNITED STATES PATENT AND TRADEMARK OFFICE
CERTIFICATE OF CORRECTION

| | | |
|---|---|---|
| PATENT NO. | : 7,097,167 B2 | Page 1 of 1 |
| APPLICATION NO. | : 10/736500 | |
| DATED | : August 29, 2006 | |
| INVENTOR(S) | : Matthias Richter et al. | |

It is certified that error appears in the above-identified patent and that said Letters Patent is hereby corrected as shown below:

<u>In column 4</u>:
Line 56: add -- a -- before "transfer".

<u>In column 5</u>:
Line 3: delete "chamber," and substitute -- chamber; -- therefor.
Line 34: delete "sleeve-shared" and substitute -- sleeve-shaped -- therefor.

<u>In column 6</u>:
Line 3: delete "lees" and substitute -- legs -- therefor.

Signed and Sealed this

Ninth Day of January, 2007

JON W. DUDAS
*Director of the United States Patent and Trademark Office*